Sept. 8, 1959  S. B. ROBBINS  2,903,681
WARNING DEVICE AND SIGNAL
Filed July 12, 1957

INVENTOR.
SAMUEL B. ROBBINS
BY
*Hillman P. Sevald*
ATTORNEY

United States Patent Office

2,903,681
Patented Sept. 8, 1959

2,903,681

WARNING DEVICE AND SIGNAL

Samuel B. Robbins, Davison, Mich., assignor to Sam Robbins, Inc., Flint, Mich., a corporation of Michigan Application July 12, 1957, Serial No. 671,651

6 Claims. (Cl. 340—220)

This invention relates to a warning device and system and more particularly pertains to a device and system that can be activated in a large area covering many users such as by official action or in an individual installation by the interruption of a circuit caused by detecting devices.

Warning devices and systems have been employed heretofore to facilitate advising persons singly and in groups of impending or actual dangerous conditions, however, the several devices of the prior art have not proven entirely satisfactory in use inasmuch as they are complicated in design and construction, expensive to manufacture, difficult to use, difficult to maintain, and sometimes cause more trouble than they are worth.

With the foregoing in view, the primary object of the inventive device and system is to provide a warning apparatus, system, and method which is simple in design and construction, inexpensive to manufacture, easy to use, easy to maintain, and which causes no burdensome additional involvement so that there is no objection from officials, power companies, and users.

An object of the invention is to provide a fail-safe warning system for dangerous conditions such as occasioned in civil defense, tornados, floods, hurricanes, and other disastrous conditions affecting groups of users.

An object of the invention is to provide a group warning system device which can be integrated with individual detection elements for the purpose of advising individual dangerous conditions such as lowered gas pressure, failure of pilot lights, burglary, fire, etc.

An object of the invention is to provide a warning device and system which is activated to produce a signal upon the interruption or failure of electrical power supply for any reason such as purposely by civil defense or other official action or accidentally such as winds, floods, tornadoes, etc.

An object of the invention is to provide a battery-powered circuit including a signalling device and a normally closed relay switch so that upon loss of electrical power the relay fails and the switch closes the circuit activating the signal device.

An object of the invention is to provide a lamp in the battery circuit for the purpose of testing the batteries and also for the purpose of providing illumination upon the failure of power supply and also for advising "all clear" as the light goes out when the power comes on.

An object of the invention is to provide a delay element in the battery signal circuit so as to prevent the inadvertent production of a signal such as when changing generators at a power supply station.

An object of the invention is to provide a split-wound relay coil or solenoid portion with center tap leads extending from the center of the coil for the purpose of using the coil for a high impedance choke for developing a low amperage circuit leading from the center taps interruptible by additional warning devices added therein as desired with the center taps having normally closed contacts which are openable for the purpose of adding detecting devices therein, whereby failure of one of the detecting elements in the coil circuit disrupts the coil permitting the relay switch in the battery circuit to close to activate the signal.

An object of the invention is to provide an indicating device such as a neon lamp across the low amperage circuit which advises a break in the coil circuit so that the user will know that the warning has been signalled by one of the added devices and not through power failure to the coil such as in disaster warnings.

An object of the invention is to provide a simplified warning system which power companies, civil defense officials, and users can adopt and employ with practically no changes in present equipment and a minimum of expense and which is also fool-proof and fail-safe.

Figure 1:
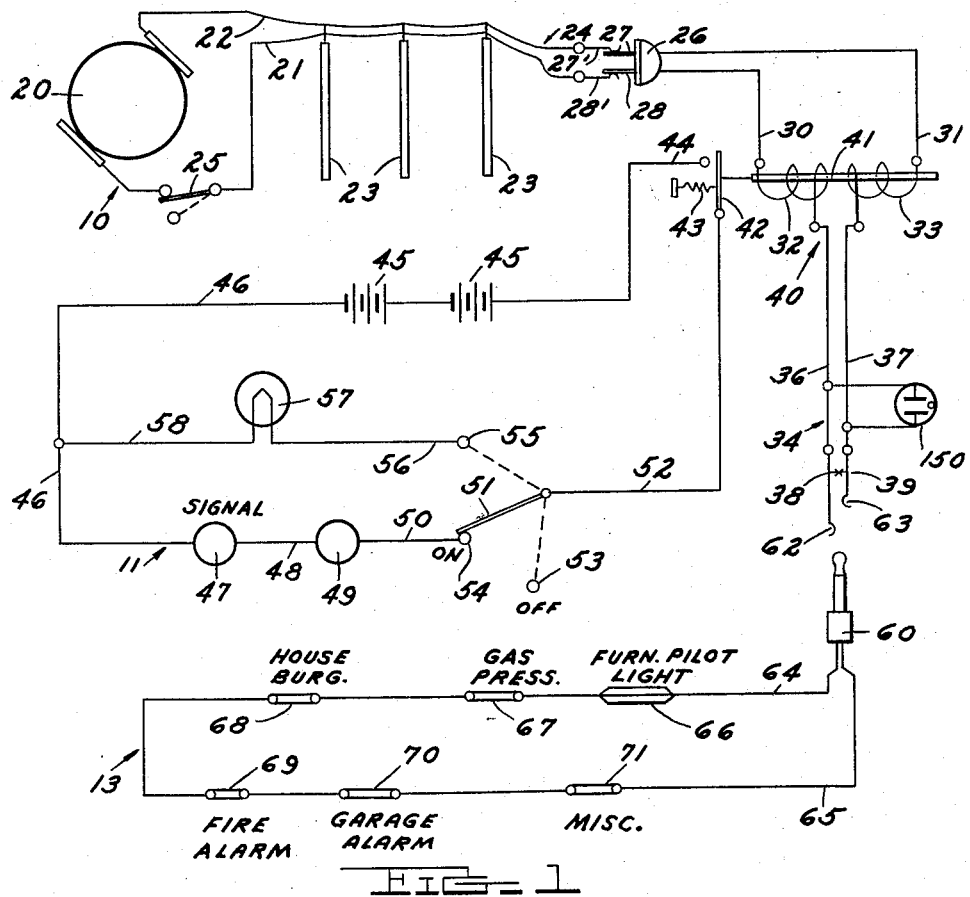
Fig. 1 is an illustration of one embodiment of my warning system.

The switch 42 is located in the signal circuit and is connected to the lead 44 which connects to the batteries 45 and the lead 46 to the signalling device 47 which may be an annunciator, bell, buzzer, light, or any other signalling or warning device and thence via the lead 48 through the delay element 49 such as a bimetallic strip operable up to 5 seconds and lead 50 to the selector on-off switch 51 and thence through the lead 52 to the upper pole of the activator switch 42; the switch 51 can be of any suitable type and the one illustrated has an "off" position 53, "on" position 54, and a lamp position 55 which connects to the parallel lead 56 which includes the lamp 57 and connects to the lead 46 via the lead 58.

Again referring to the low amperage solenoid coil circuit, the jack 60 is receivable between the jack socket clips 62 and 63 and when the jack is inserted therebetween, the contacts 38 and 39 are separated so that the low amperage leads 36 and 37 now lead through the supplementary warning circuit 13 which includes the leads 64 and 65 of the closed loop series circuit which includes for example the thermo-acting or bimetallic thermostat element 66 such as for a furnace pilot light, a pressure sensitive switch 67 such as operated by a diaphragm in a gas utility supply, a house burglary alarm 68, a lead foil fire alarm element 69, a garage alarm element 70 and any other miscellaneous alarm or detecting devices 71 as desired by the user. It is obvious that the failure of one of the elements 66 through 71 interrupts the circuit between the split coils 32 and 33 depriving them of a complete circuit so that the solenoid portion of the relay 40 fails permitting the switch 42 to close the battery warning circuit of the device 11.

Figure 2:
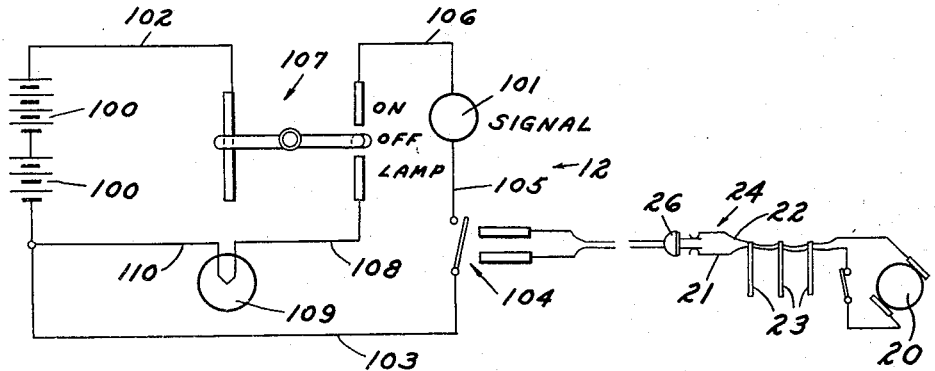
Fig. 2 is an illustration of a simplified form of my invention.

A simplified warning device of Fig. 2 comprises the batteries 100 connected to the signalling element 101 via the leads 102, 103, the relay 104, lead 105, lead 106, and the switch 107 which is shown in the "off" position but which is capable of moving to the "on" position between the leads 102 and 106 and which is also capable of moving in the opposite direction to the lamp parallel circuit which includes the leads 108, lamp 109, and lead 110 connected to the lead 103.

Referring now to the operation of the inventive device of Fig. 2 it will be noted that the power supply 20 leads through the power station switch 25 and is carried on the lines 21 and 22 supported by the poles 23 to the user outlet 24 which is picked up by the plug 26 and transferred to the relay 104 of the warning device 12 so that with the switch 107 in the "on" position and the relay 104 energized the signal device 101 is de-activated due to the fact that the switch of the relay 104 is open in the battery circuit. However, upon the official advice such as from Civil Defense Authorities, the power station operator opens the switch 25 such as to advise of aerial attack, tornados, and other disastrous conditions so that upon the power in the lines 21 and 22 being interrupted the relay 104 is de-energized permitting its switch 42 to close the circuit of the device 12 whereby the batteries are connected via the leads and switch 107 to the signalling device 101 whereupon a signal is produced. The station operator can intermittently open and close the station switch 25 thereby giving any desired signal to users so that they can be advised of the particular type of disaster conditions that may confront them. The lamp circuit including the lamp 109 provides adequate means for testing the batteries 100 to insure their life and also for the purpose of providing illumination upon the failure of power such as when communication lines are broken by tornados or bombings.

In using the device seen in Fig. 1, the user inserts the plugs 26 in the outlet 24 thereby connecting the relay 40 to the power supply 20 via the lines 21 and 22 as carried on the pole 23 and as controlled by the station switch 25 and due to the fact that the low amperage circuit 34 eminating from the center taps of the split coils 32 and 33 is closed either by the contacts 38 and 39 or by the detecting device series circuit 13 when the jack 60 is inserted in the socket between the prongs 62 and 63, it will be understood that the soleonid portion of the relay 40 is capable of holding the armature 41 in such position as to hold the switch 42 open and it is to be understood that upon the withdrawal of the jack 60 the contacts 38 and 39 maintain the circuitry of the split coils 32 and 33. The contacts 38 and 39 or the alarm circuit 13 acts as a short circuit relative to the small neon lamp 150 under normal conditions which is disposed across the low amperage leads 36 and 37 and it is to be understood that upon the insertion of the jack 60 and the failure of one of the detecting elements, such as the fire alarm 69, that the short circuit across the lamp 150 would be broken so that the lamp 150 would glow indicating that there was a failure in the low amperage detection circuit rather than an indication that the alarm has been sounded due to area emergency conditions. However, the draw of power by the lamp 150 is insufficient to power the relay 40 so that the relay fails due to the broken low amperage circuit and permits the switch 42 to close in the warning battery circuit thereby energizing the signalling device 47 to produce a signal.

As in the device of Fig. 2 the lamp 57 parallel circuit provides means for testing the energy of the batteries 45 and also illumination in the event of power failure. The operation of the device of Fig. 1 under a national emergency condition as signalled by opening the switch 25 in the power station results in a complete failure of power to the relay 40 permitting the switch 42 to close in the battery circuit whereby the device 47 is activated to produce a signal. The delay element 49 is an optional item which may be introduced in the system for the purpose of delaying the supplying of electrical energy to the signalling element 47 such as some power systems include a temporary interruption in the normal changing of generators.

The inventive warning device and system with the features described constitutes a very small, simple, compact, durable, and neat appearing mechanism easily purchased by anyone, and easily operated and installed.

Although but a single embodiment of the invention has been shown and described in detail it is obvious that many changes may be made in the size, shape, detail, and arrangement of the various elements of the invention within the scope of the appended claims.

I claim:

1. A simplified combined public and private warning system such as for use in alerting groups for civil defense, tornados, floods or other reasons and individual users for fire, etc., comprising an electrical power supply station normally constantly suplying E.M.F. to consumers such as industrial, commercial, homes, schools, clubs, etc. in an area, switch means in said station for cutting off power to consumers, power transmission means from said station to consumers, consumer power outlets connected to said transmission means, at least one warning device connected to a consumer power outlet, said device comprising a normally closed relay energized by said supply station at said outlet, a normally closed circuit controlled by said relay, a battery in said circuit, a signal element in said circuit; said device being activated by failure of power supply such as by opening said station switch to de-energize said relay to permit said signal circuit to close to connect said battery to said signal element to produce a signal, an electric lamp in parallel to said signalling element, a switch for selectively closing said signalling or lamp circuits; said switch having a third off position for de-activating the device in the system; said relay having a split-wound coil connected at either end to said power outlet and intermediate center tap leads extending into a normally closed low amperage relay-supply circuit for holding said signal circuit open and interruptible for disabling said relay to close said signal circuit; said relay-supply circuit having at least one sensing device therein such as a fire alarm for breaking said relay supply circuit to disable said relay to permit said signal circuit to close to activate said signalling element, and a neon lamp across said relay circuit for designating the signal as non-power supply initiated.

2. A device for use in a warning-alarm system comprising a normally closed signal circuit having a signal element; said signal circuit being controlled by a relay; said signal circuit in the first instance being activated for warning by interruptions in power supply to said relay to permit said relay to close said signal circuit; said relay having split-wound solenoid coil portions leading inwardly to electrical center at center taps; a low amperage circuit connected to said center taps completing the relay coil circuit; said low amperage circuit having at least one detecting device therein such as a fire alarm; said signal circuit in the second instance being actuated for alarm by interruption in said low amperage circuit by said detecting device to cause said relay coil to fail to cause said relay to close said signal circuit.

3. In a device as set forth in claim 2, a neon lamp across said low amperage circuit normally shorted out by the said circuit and actuated by breaking said low amperage circuit; said lamp not having sufficient electrical transmission capacity to prevent said relay coil from failing to hold said signal circuit switch open; said neon lamp providing indication that the signal element activation is due to alarm device conditions and not power-failure warning conditions.

4. In a device as set forth in claim 2, an incandescent lamp in said signal circuit for providing light in case of power failure.

5. A simplified warning system such as for use in alerting persons for civil defense, tornados, floods or other reasons, comprising an electrical power supply station normally constantly supplying E.M.F. to consumers such as industrial, commercial, homes, schools, clubs, etc. in an area, switch means in said station for cutting off power to consumers, power transmission means from said station to consumers, consumer power outlets connected to said transmission means, at least one warning device connected to a consumer power outlet, said device comprising a normally open relay energized by said supply station at said outlet, a normally open signal circuit controlled by said relay, a battery in said circuit, and a signal element in said circuit; said device being activated by failure of power supply such as by opening said station switch to de-energize said relay to permit said signal circuit to close to connect said battery to said signal element to produce a signal; said relay having a split-wound coil connected at either end to said power outlet and intermediate center-tap leads extending into a normally closed circuit interruptible for disabling said relay to close said signaling device circuit such as by burglary, fire, or gas pressure device connectable thereto being set-off.

6. A simplified warning system such as for use in alerting persons for civil defense, tornados, floods or other reasons, comprising an electrical power supply station normally constantly supplying E.M.F. to consumers such as industrial, commercial, homes, schools, clubs etc. in an area, switch means in said station for cutting off power to consumers, power transmission means from said station to consumers, consumer power outlets connected to said transmission means, at least one warning device connected to a consumer power outlet, said device comprising a normally open relay energized by said supply station at said outlet, a normally open signal circuit controlled by said relay, a battery in said circuit, and a signal element in said circuit; said device being activated by failure of power supply such as by opening said station switch to de-energize said relay to permit said signal circuit to close to connect said battery to said signal element to produce a signal; said relay having a split-wound coil connected at either end to said power outlet and intermediate center tap leads extending into a normally closed low amperage relay supply circuit for holding the signal circuit open and interruptible for disabling said relay to close said signal circuit, and at least one sensing device in said low amperage circuit capable of breaking said circuit.

References Cited in the file of this patent
UNITED STATES PATENTS
2,811,712  Saunders _____ Oct. 29, 1957